US006264071B1

(12) United States Patent
Dentler

(10) Patent No.: US 6,264,071 B1
(45) Date of Patent: Jul. 24, 2001

(54) VISCOUS MATERIAL DISPENSER

(75) Inventor: Christopher G. Dentler, Portland, OR (US)

(73) Assignee: Z-Pro International, Inc., Portland, OR (US)

( * ) Notice: Subject to any disclaimer, the term of this patent is extended or adjusted under 35 U.S.C. 154(b) by 0 days.

(21) Appl. No.: 09/586,194

(22) Filed: Jun. 2, 2000

Related U.S. Application Data

(62) Division of application No. 09/181,143, filed on Oct. 27, 1998, now Pat. No. 6,155,463.

(51) Int. Cl.[7] ............................ B65D 88/54; G01F 11/06; G01F 11/30; G01F 11/36; G01F 11/42

(52) U.S. Cl. ............................ 222/391; 222/326; 222/391

(58) Field of Search .................................... 222/325, 326, 222/327, 391

(56) References Cited

U.S. PATENT DOCUMENTS

| | | | |
|---|---|---|---|
| 604,748 | 5/1898 | Guttenberg . | |
| 1,206,513 | 11/1916 | Coppes . | |
| 2,037,349 | 4/1936 | Svetlik . | |
| 2,059,135 | 10/1936 | Moe . | |
| 2,319,739 | 5/1943 | Kessler . | |
| 2,388,111 | 10/1945 | Berman . | |
| 2,731,176 * | 1/1956 | Crewe | 222/326 |
| 2,801,775 | 8/1957 | Slobin . | |
| 3,147,890 | 9/1964 | Mittelsteadt . | |
| 4,390,115 | 6/1983 | Bigham . | |
| 5,390,825 | 2/1995 | Rockel . | |
| 5,482,189 | 1/1996 | Dentler et al. . | |
| 5,553,754 | 9/1996 | Dentler . | |
| 5,595,327 | 1/1997 | Dentler et al. . | |

* cited by examiner

*Primary Examiner*—Kevin Shaver
*Assistant Examiner*—Stephanie Willatt
(74) *Attorney, Agent, or Firm*—Ipsolon llp

(57) ABSTRACT

A material dispenser for receiving a material container and for dispensing material from the container is disclosed. The material dispenser includes a frame having a body, depending handle and rails that extend forward from the body. The material dispenser also includes a trigger actuated plunger mechanism that is operative to push a piston in the material container to dispense material from the container. The material container is held in the material dispenser by a rear receptacle and a distal receptacle. The rear receptacle is coupled to the rails and may be pivoted between a position that is facing the distal receptacle and a position that is oblique to the distal receptacle. The distal receptacle is also coupled to the rails and includes an opening that is located between the rails, and a clip that can engage and retain the material container. A material container may be mounted in the material dispenser by orienting the rear receptacle into the position that is oblique to the distal receptacle, inserting a rear end of the material container into the rear receptacle and pivoting the material container and rear receptacle in concert to align the material container with the rails to permit proper operation of the plunger mechanism. When a forward end of the material container reaches the distal receptacle, the material container must be forced into the distal receptacle past the retaining clip.

19 Claims, 3 Drawing Sheets

VISCOUS MATERIAL DISPENSER

RELATED APPLICATION INFORMATION

This application is a divisional of application Ser. No. 09/181/143 now U.S. Pat. No. 6,155,463, filing date Oct. 27, 1998.

BACKGROUND OF THE INVENTION

1. Field of the Invention

This invention pertains to the field of material dispensers that receive prepackaged containers of viscous material and provide a mechanical force to dispense the material from the container. Common viscous materials that are prepackaged and dispensed in this manner include silicone caulk and construction adhesives.

2. Description of the Related Art

Caulk dispensers, also referred to as caulk, or caulking, guns, are disclosed in prior art patents U.S. Pat. Nos. 5,595,327, 5,553,754, and 2,801,775. Such dispensers receive a tube of caulk and provide a trigger-actuated plunger that pushes against a rear piston of the caulk tube to dispense caulk through a caulk tube nozzle.

Problematically, many prior art caulk dispensers drool caulk from the nozzle even after the dispenser operator stops actuating the plunger. Because the plunger is urged against the caulk tube piston (unless the plunger is disengaged), and because many viscous materials are compressible, caulk drools out of the nozzle even after the operator stops activating the plunger. This caulk drool can cause caulk to end up in unintended places and prevents a clean professional appearance to caulk work.

A partial work-around solution to caulk drool is to quickly disengage the plunger as soon as the operator desires to stop the flow of caulk. However, this solution requires quick two handed action—action which can be dangerous in some circumstances, such as when working on a ladder. Also, this solution does not address a problem of caulk drool while the operator temporarily ceases operation while re-cocking the dispenser trigger. Additionally, this solution is only a partial solution because many viscous materials, such as silicone caulk, are slightly compressed during the dispensing operation and continue to drool from the caulk tube even after the plunger is disengaged.

U.S. Pat. Nos. 5,595,327 and 5,553,754 disclose caulk dispensers that prevent caulk drool by coupling the plunger to the caulk tube piston and providing a spring that urges the plunger backward when the dispenser trigger is released. This backward urging and plunger—piston coupling urge the piston backward within the caulk tube thus reducing pressure within the caulk tube to prevent caulk from drooling from the nozzle after the trigger is released. Such caulk dispensers perform well to end caulk drool. Though not literally correct, this feature is often described as "dripless" in the art.

However, a problem occurs in prior art devices that have this plunger—piston coupling. Such prior art caulk dispensers have a caulk tube cradle that receives the caulk tube that includes a half-cylinder having a rear receptacle and a forward receptacle. The caulk tube is mounted in the cradle by inserting a rear end of the tube into the cradle's rear receptacle at an angle and pushing the tube fully into the rear receptacle and then swinging the caulk tube downward into the cradle while the tube nozzle is guided into a nozzle cutout in the forward receptacle. The tube is then slid forward to rest against an inside surface of the forward receptacle. When the plunger pushes against the caulk tube piston, the caulk tube is pushed forward against the forward receptacle, which receptacle prevents forward motion of the caulk tube.

To accommodate mounting the caulk tube into the cradle, the distance between the rear receptacle and the forward receptacle must be substantially greater than the length of the caulk tube. Accordingly, the caulk tube is able to slide longitudinally along the cradle between the rear receptacle and the forward receptacle.

In conventional caulk dispensers that do not have the no-drool feature, the longitudinal play of the caulk tube in the cradle is not a problem because the plunger maintains a forwardly-directed pressure on the caulk tube (which is, in part, why the caulk tube continues to drool caulk after the operator stops operation of the dispenser).

However, in caulk dispensers with the above-described no-drool feature, the plunger draws rearwardly slightly to stop caulk drool. And, if the caulk tube is able to move longitudinally in the cradle, the caulk tube moves rearwardly in response to the rearward draw of the plunger. The effect is slight, so that the no-drool feature works well when the dispenser is oriented with the caulk nozzle downward. However, when the dispenser is oriented with the nozzle upward, the caulk tube tends to slide rearwardly under the force of gravity and when the plunger withdraws slightly, the caulk tube moves rearwardly and the dispenser is made effete.

Methods to prevent the rearward motion of the caulk tube when the plunger withdraws are disclosed in U.S. Pat. Nos. 5,482,189 and 5,595,327 and include a moveable backplate that is biased fowardly against a back end of the caulk tube to resist that rearward urging of the plunger. Other methods include various devices to capture the caulk tube in the cradle, such as tube clamping collars.

While, these methods provide satisfactory service, they are not optimum for manufacturing or operation because of extra parts, additional cost, added complexity (no one expects to use an instruction sheet to load a tube of caulk into a caulk gun) and extra steps of operation. Thus, a caulk dispenser that provides no-drool operation, minimum parts and operation steps, and a substantially conventional means to install a caulk tube is desirable.

Additionally, while it is normally advantageous to have a no-drool caulk dispenser, it is sometimes desirable to have a caulk dispenser that performs conventionally. Thus, a caulk dispenser that is easily convertible from no-drool operation to conventional operation is also desirable.

SUMMARY OF THE INVENTION

The present invention addresses the deficiencies of the prior art by providing a dispenser for dispensing a viscous material from a material container, the dispenser having a frame and a material container receptacle that receives an elongate material container and inhibits longitudinal movement of the container relative to the frame. In preferred embodiments, the material dispenser includes a rear receptacle that is pivotally coupled to the frame and that can be oriented to receive a rear end of the material container and then re-oriented to align the material container in the dispenser for operation. The dispenser preferably also includes a biasing clamp that is coupled to the frame and that partially encapsulates and retains the material container.

The present invention provides an advantage when coupled with prior art no-drool dispensers, such as those dispensers having a plunger with a flexible rim that engages a moveable piston in a material container. However, the present invention also provides an advantage when coupled with conventional prior art dispensers.

The present invention also provides a method of installing a material container in the material dispenser wherein a rear receptacle is oriented to receive an end of a material container and the receptacle and container are reoriented to provide a desired alignment of the container for operation with a plunger mechanism. Preferably, the method also includes coupling the material container to a biased retainer of the dispenser.

DESCRIPTION OF THE PREFERRED EMBODIMENTS

Figure 1:
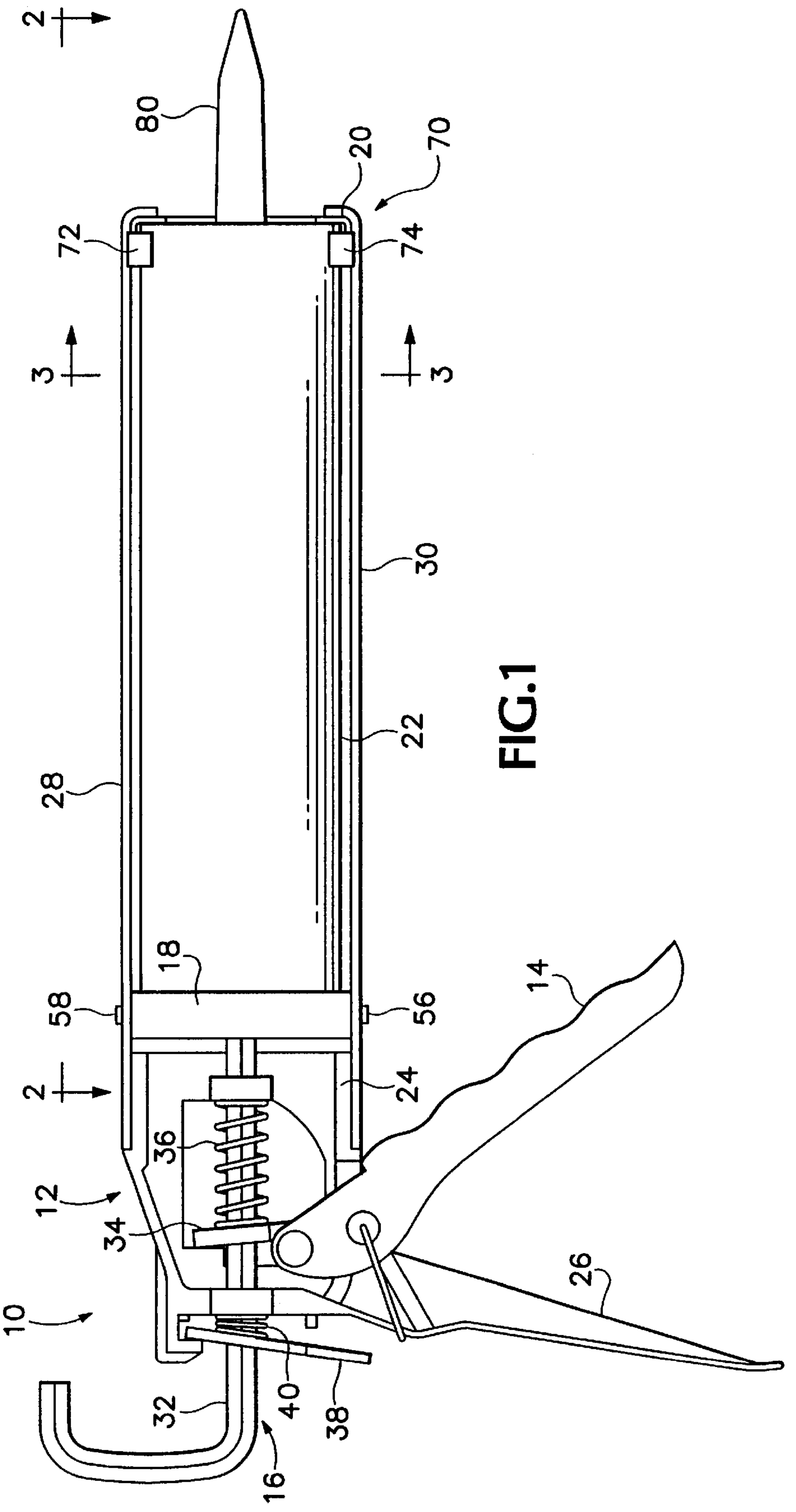
FIG. 1 is a side elevation view of a preferred embodiment of a material dispenser of the present invention having a material container mounted therein.

With reference to FIG. 1, a first embodiment of a material dispenser 10 of the present invention is described. The material dispenser includes a frame 12, onto which are mounted a trigger 14, a plunger mechanism 16, a rear receptacle 18, and a distal receptacle 20. A material container 22 is shown mounted in the material dispenser 10 and retained by rear receptacle 18 and distal receptacle 20.

The frame 12 includes a main body 24 with a depending handle 26 and two rails, or stringers, 28 and 30 that extend in a forward direction from the body 24. The rear receptacle 18 and distal receptacle 20 are coupled to the rails 28, 30. Preferably, the rear receptacle 18 is pivotally mounted to the rails 28 and 30 and the distal receptacle 20 is fixedly coupled to the rails 28 and 30. The trigger 14 is pivotally coupled to the frame body 24 at a location near the demarcation between the body 24 and handle 26.

The plunger mechanism 16 includes a plunger rod 32, a first dog 34, first spring 36, second dog 38, second spring 40, and push plate 42 that has a flexible circumferential rim 44. Similar plunger mechanisms are known in the art and are described in prior art patents (U.S. Pat. Nos. 5,482,189 and 5,553,754), and are briefly described below.

The rear receptacle 18 is located proximate, but spaced apart from, the body 24 and is pivotally coupled to the rails 28, 30 so that the rear receptacle can pivot relative to the rails. The rear receptacle 18 forms a cup-shaped receptacle that has a cutout 46 in a bottom 48 to permit passage of the rod 32. As a cup-shaped receptacle, the rear receptacle 18 defines a chamber 50 that receives an end of the material container 22 through an opening 52. The bottom 48 defines an inside bottom surface, or rear wall, 54 for retaining the material container 22 against longitudinal movement when the material container is installed in the material dispenser 10.

Preferably, the rear receptacle is pivotally coupled to the rails 28, 30 by rivets 56, 58. The rivets are loosely staked so that the rear receptacle can pivot about the rivets relative to the rails 28, 30. Other means for coupling the rear receptacle to the frame include pins, stakes, pintles, and any other coupling that permits rotation of the rear receptacle relative to the frame.

Further, the rear receptacle is spaced-apart from the frame body 24 by a space 60 so that the rear receptacle can pivot sufficiently without impinging upon the body.

The distal receptacle 20 is, preferably, fixedly coupled to the rails 28, 30 at a distal end 62 located distally of the body 24. The distal receptacle includes a C-shaped plate 64 having a flange 66. The plate 64 defines an inner surface, or distal end wall, 68 oriented to face the rear receptacle 18 and provide an abutting wall for the material container when the plunger pushes against the piston 84 located in the material container 22.

The distal receptacle 20 further includes a retaining clip 70 that substantially follows the contour of the plate's flange 66 and terminates at each end in oversized returns 72 and 74. The oversize returns wrap around ends of the flange 66 to retain the clip on the C-shaped plate 64. By virtue of being oversize, the clip ends define an opening 76 between the returns 72 and 74 that is somewhat smaller than a lateral dimension 78 of the material contain 22. Thus, when the material container is forced into the distal receptacle 20, the lateral margins of the container contact the clip returns 72 and 74, but may be forced past the returns because the clip is resilient and gives way to the forcible entry of the material container. Once forced into the distal receptacle, the material container is retained by the oversize returns of the clip until sufficient force is applied to force the material container past the clip-end returns and out of the distal receptacle.

Figure 3:
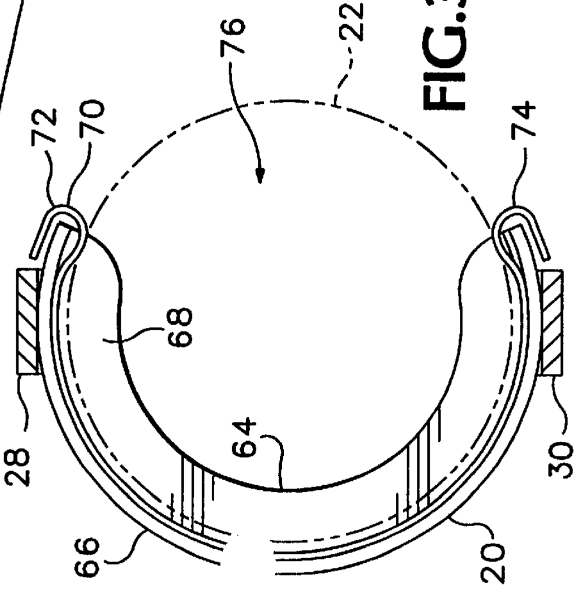
FIG. 3 is a cross-section view of the invention of FIG. 1 as viewed along line 3—3.

The C-shaped plate 64 is oriented so that the opening 76 is between the rails 28 and 30. Using FIG. 3 as a reference, rails 28 and 30 are arranged at 12 o'clock and 6 o'clock, respectively, and the opening 76 is arranged at the 3 o'clock position. Alternatively, given the arrangement of rails as shown in FIG. 3, the opening 76 may also be arranged at the 9 o'clock position. In addition, the rails 28, 30 may be arranged differently and the opening 76 arranged accordingly. For example, the rails 28 and 30 may be arranged at 3 o'clock and 9 o'clock positions, respectively and the opening 76 arranged at the 12 o'clock or 6 o'clock positions. Other arrangements are also within the scope of the invention.

Alternative embodiments of the rails 28, 30 include a single rail, a half cylinder, or other structure that supports a pivoting rear receptacle and a distal receptacle.

Figure 2:
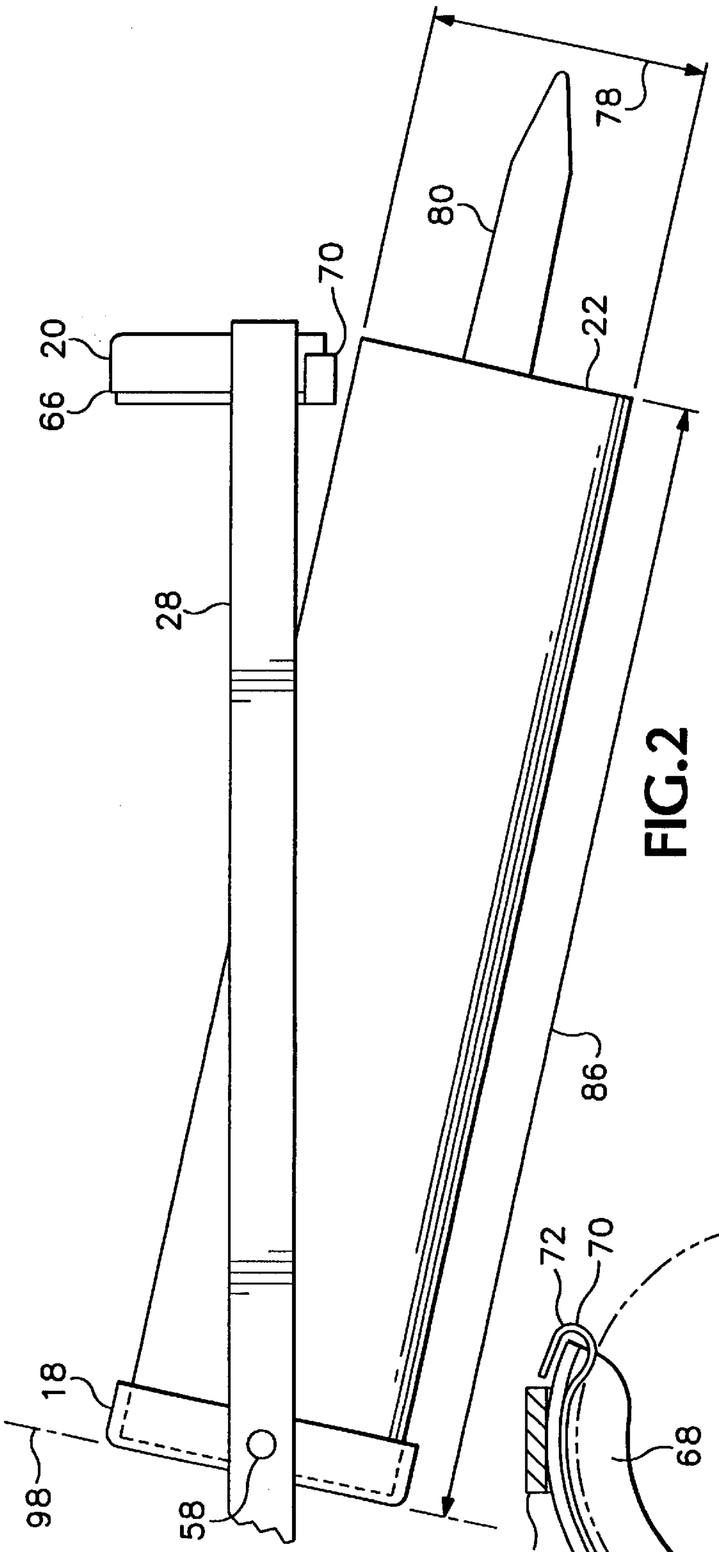
FIG. 2 is a top plan view of a portion of the material dispenser of FIG. 1 as viewed along line 2—2 of FIG. 1 and wherein a material container receptacle is pivoted obliquely to a distal receptacle so as to accept an end of the material container.

A description of the operation of the present invention follows. For purposes of this description, the rails 28 and 30 define longitudinal axes and the material container is elongate. A material dispenser 10 is prepared to receive a material container 22 by pivoting the rear receptacle 18 about the rivets 56, 58 so as to orient a plane 98, associated with the rear receptacle 18, oblique to the longitudinal axes. Thus, the rear receptacle opening 52 is oriented to face away from the distal receptacle 20 similarly as shown in FIG. 2.

A rear end of a material container 22 is then inserted into the rear receptacle and the material container is pushed into contact with the receptacle inside bottom surface 54. Thereafter, the material container and rear receptacle are pivoted in concert to bring the material container into substantially parallel alignment with the longitudinal axes and the plane 98 into substantially orthogonal alignment with the longitudinal axes.

As the material container is pivoting, a forward end of the container will contact the oversize returns 72, 74 of the clip 70. Additional force is required against the material container to resiliently deform the clip and move the material container past the oversize returns into position within the distal receptacle. As the material container enters the distal receptacle, a nozzle 80 is received in the distal receptacle opening 76 and projects forwardly of the distal receptacle for use in dispensing material.

The material container may be removed by reversing the above-described steps to load the material container into the material dispenser.

As noted, the present invention addresses a problem associated with prior art no-drool dispensers. When a dispenser is operating in a no-drool mode, the plunger rod 32 is urged backward in the direction of arrow 82 (FIGS. 4 and 5) when pressure on the trigger is reduced and the first spring 36 urges the first dog 34 backward. This backward urging on the plunger rod creates a partial vacuum between the plunger push plate 42 and a material container piston 84 which urges the piston backward. The push plate 42 and piston 84 are also mechanically coupled by virtue of the contact of the flexible rim 44 and the piston. Because of these forces, urging the piston backward in the direction of arrow 82, the material container 22 is also urged backward and the material container will move backward if not constrained against longitudinal movement.

The present invention inhibits longitudinal movement of the material container 22 when the material container is located in the material dispenser 10. In the preferred embodiment, the rear wall 54 of the rear receptacle 18 is spaced apart from the distal wall 68 of the distal receptacle 20 by a distance that is approximately equal to, or slightly longer than, a longitudinal length 86 of the material container 22.

A brief description of the plunger mechanism 16 follows. The trigger 14 is operated by manually squeezing the trigger and handle 26 to force the trigger to pivot backward moving the trigger toward the handle. The backward motion of the trigger 14 pushes a lower portion of the first dog 34 forwardly, canting it on the plunger rod 32 so that the first dog grabs the plunger rod and forces it forward in the direction of arrow 88 as shown in FIG. 5. When pressure on the trigger is relaxed, the first spring 36 urges the first dog backward in the direction of arrow 82 and pivots the trigger forwardly to its relaxed position. Absent other forces on the plunger mechanism 16, the plunger rod 32 will move backward in the direction of arrow 82 as the backward pressure on the trigger is relaxed because the first dog is canted on the plunger rod until it reaches a relaxed position against the frame body 24 as shown in FIG. 4.

Figure 4:
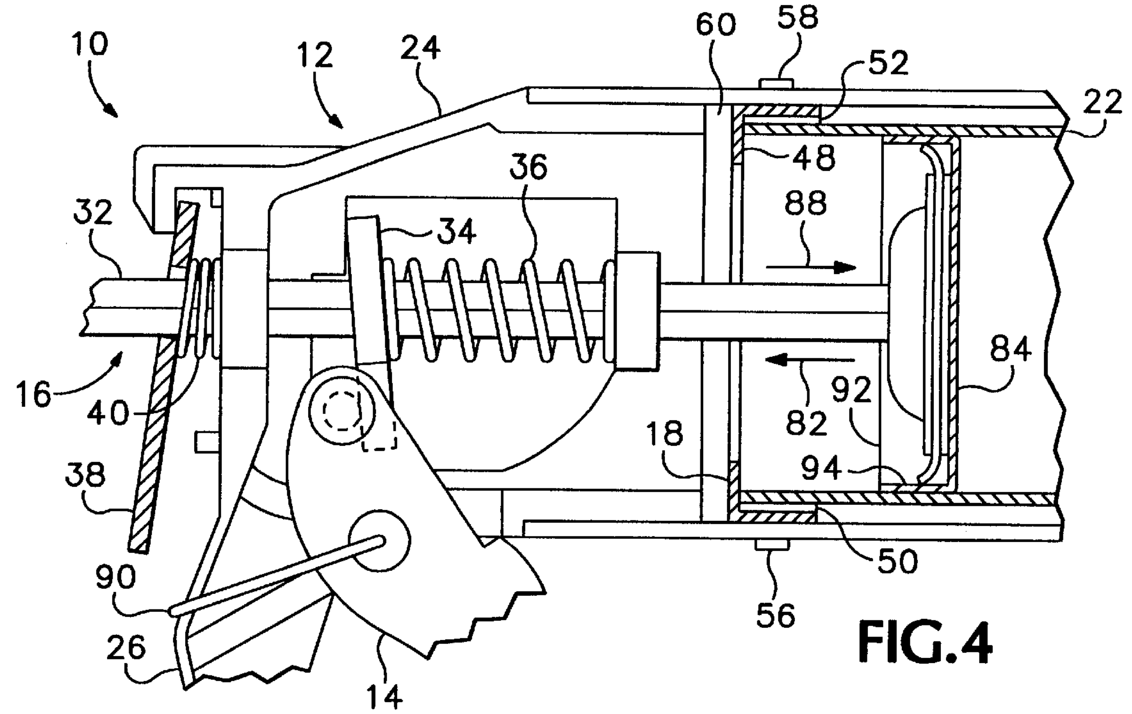
FIG. 4 is a partial side elevation, cross-section view of the invention of FIG. 1 enlarged to show detail of an actuation mechanism in a first mode of operation.
Figure 5:
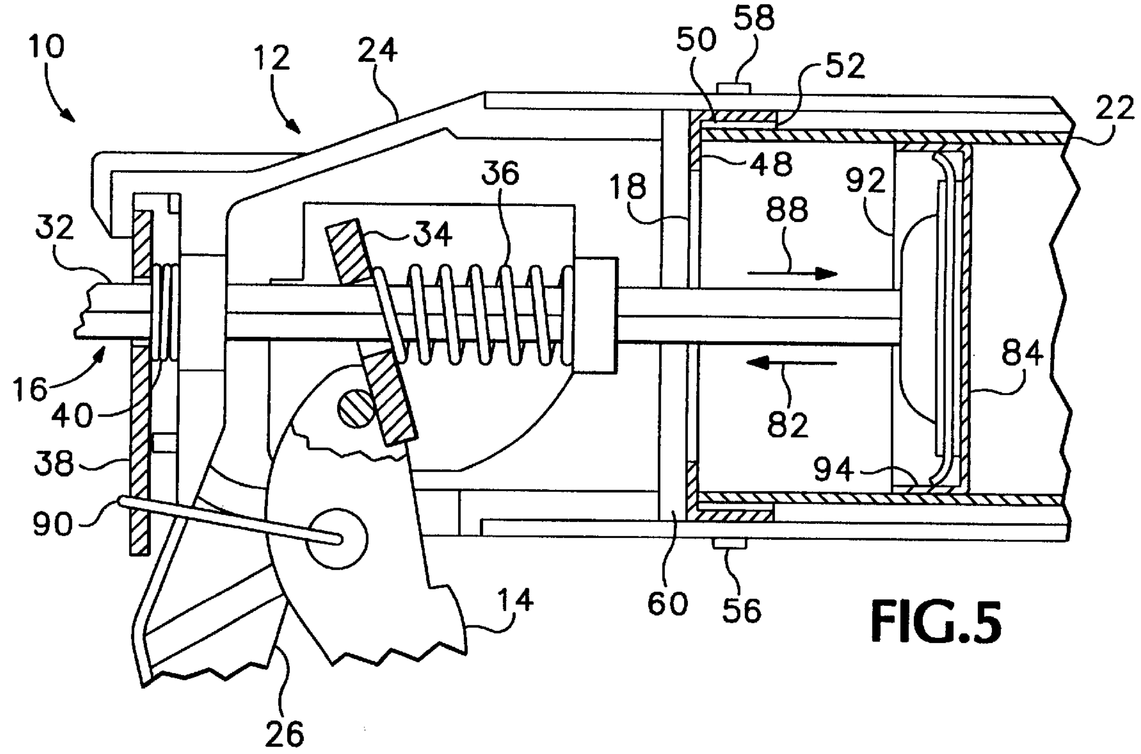
FIG. 5 is a partial side elevation, cross-section view of the invention of FIG. 1 enlarged to show detail of the actuation mechanism in a second mode of operation.

The dispenser of FIGS. 1, 4 and 5 has two modes of operation that are selected by the position of the second dog 38. When the second dog is in a free position, as shown in FIG. 4, the second spring 40 biases the second dog rearward canting the second dog on the plunger rod 32 so as to prevent backward motion of the plunger rod 32 in the direction of arrow 82 and permit forward motion of the rod 32 in the direction of arrow 88. This mode is designated the conventional mode.

Thus, in the conventional mode, operation of the trigger cants the first dog 34 on the plunger rod so that the first dog grabs the plunger rod and moves the plunger rod forward in the direction of arrow 88. Releasing pressure on the trigger 14 allows the first spring 36 to urge the first dog backward. Because the first dog is still canted on the plunger rod, the plunger rod is urged backward too. However, backward motion of the plunger rod is prevented by the second dog and the first dog skids backward along the plunger rod without effect. Thus, in the conventional mode, the plunger rod can proceed only forward in the direction of arrow 48. To move the plunger rod backward in the direction of arrow 50, the second dog must be depressed and held.

A second mode is achieved by latching the second dog in the depressed position by latch 90 as shown in FIG. 5. In the latched position, the second dog is not canted on, and does not grip, the plunger rod 32. Thus, movement of the plunger rod is not affected by the second dog when the second dog is latched.

In this second mode, designated the no-drool mode, squeezing the trigger 14 cants the first dog on the plunger rod 32 and moves the plunger rod forward in the direction of arrow 88. When pressure on the trigger is relaxed, the first spring 36 moves the first dog 34 backward and likewise urges the plunger rod 32 backward in the direction of arrow 82. However, backward motion of the plunger rod is resisted by a frictional fit between the flexible rim 44 of the plunger push plate 42 and the moveable piston 84 located in the material container 22.

The moveable piston 84 includes a rearward cylindrical flange 92 and the plunger plate 42 and flexible rim 44 are sized to fit within the flange 92 and the flexible rim impinges on an inside surface 94 of the flange 92 so as to sealingly engage the flange. When the flexible rim 44 and flange 92 are so engaged, backward motion of the plunger rod 32 creates a partial vacuum in an interstices 96 between the push plate 42 and piston 84 and thus urges the piston backward, in the direction of arrow 82, enough to relieve pressure in the material container and prevent material from seeping out a nozzle 80 when the trigger 14 is relaxed and not applying pressure to the piston. The flexible rim 44 also engages the piston flange 92 mechanically such that mechanical forces act on the piston 84 when the plunger rod 32 is urged backward.

Because the rear receptacle 18 is spaced from the distal receptacle 20 by a distance substantially equal to, or slighter greater than, the length 86 of the material container 22, the material container can not slide rearwardly a significant amount when the plunger mechanism 16 operates so as to urge the container piston 84 rearwardly. When the container is urged rearwardly, the container abuts the rear receptacle and is stopped from rearward motion.

While substantial discussion, particularly in the background and summary of the invention, describes the dispenser as a dispenser for caulk that is provided in cylindrical tubes, the invention is also applicable to other applications that dispense a viscous material from a container wherein the container includes a moveable surface that can be forced to move to expel the material from the container. Thus, for example, the dispenser may be used to dispense adhesives, tars, viscous plastics, viscous cementious derivatives, or any other such material.

Further, the dispenser may be used to dispense such material from containers other than cylindrical, elongate tubes, such as square cross-section tubes, oval cross-section tubes, short tubes (i.e., not elongate), and cubes. Any container having a substantially uniform cross-section along its length may be used with the present invention and would require only that the dispenser described above and shown in the accompanying drawings be modified to be compatible with the cross section such as by modifying the plunger and container receptacles.

This specification sets forth the best mode for carrying out the invention as known at the time of filing the patent application and provides sufficient information to enable a person skilled in the art to make and use the invention. The specification further describes materials, shapes, configurations and arrangements of parts for making and using the invention. However, it is intended that the scope of the invention shall be limited by the language of the claims as construed by the law of the land as pertains to valid U.S. patents.

What is claimed is:

1. A material dispenser comprising an elongate frame defining a longitudinal frame axis, a trigger operatively connected to an elongate plunger slidably held in the frame so that operation of the trigger moves the plunger longitudinally relative to the frame, said frame including a first material container receptacle and a distal material container receptacle configured for receiving a material container having a diameter installed therebetween, the distal receptacle including a biasing clip that partially encapsulates and retains said material container when said material container is received in said distal receptacle, said biasing clip having a first clip end and a second clip end defining a normal clip opening therebetween smaller than the diameter of said material container.

2. The material dispense of claim 1 wherein the distal receptacle has a rearward facing flange defining a semi-circular member having a first flange end and a second flange end defining a flange opening therebetween equal to or greater than said diameter.

3. The material dispenser of claim 1 wherein said first and second clip ends may be forced apart to enlarge the normal clip opening to define an extended clip opening that is equal to or greater than the diameter of the material container.

4. The material dispenser of claim 3 wherein said biasing clip is resilient and said clip ends return to said normal clip opening when said material container is received in said distal receptacle.

5. The material dispenser of claim 1 wherein the material container can be forced past said first clip end and said second clip end and into said opening to be received in the distal receptacle and the biasing clip retains the material container in the distal receptacle.

6. The material dispenser of claim 1 wherein the biasing clip defines a semi-circular member having a semi-circular diameter about the same as the material container diameter.

7. The material dispenser of claim 2 wherein the biasing clip is located against and inwardly of the flange.

8. The material dispenser of claim 7 wherein the biasing clip is attached to the flange.

9. A dispenser that controls dispensing a viscous material from a material container that includes a moveable surface that moves along an interior surface of the container so as to expel the viscous material through an opening in the container, the dispenser comprising:

(a) an elongate frame defining a frame axis;

(b) a rear receptacle attached to the frame and defining a planar rear wall generally transverse to the frame axis, said rear receptacle having a central opening therethrough;

(c) a handle attached to the frame;

(d) an actuator;

(e) a plunger held in the frame and extending through said central opening in said planar rear wall so that operation of the actuator moves the plunger longitudinally relative to the frame and along the frame axis;

(f) a distal receptacle attached to the frame, said distal receptacle defining a planar distal wall and a rearward facing flange having first and second spaced apart flange ends defining an opening therebetween; and (g) clip means on said distal receptacle for retaining a material container in an operative position between said rear and distal receptacles for dispensing said viscous material.

10. The dispenser of claim 9 wherein said material container has a material container diameter and said rear receptacle includes a forward facing flange defining a rear flange diameter that is larger than said material container diameter.

11. The dispenser of claim 9 wherein said clip means comprises a biasing clip having a first clip end and a second clip end that in a first position define a clip opening therebetween smaller than said material container diameter.

12. The dispenser of claim 11 wherein the distal receptacle has a rearward facing semi-circular flange having a first flange end and a second flange end defining a flange opening therebetween equal to or greater than said material container diameter.

13. The dispenser of claim 11 wherein said first and second clip ends may be forced apart to a second position to define an extended clip opening that is equal to or greater than the material container diameter.

14. The dispenser of claim 13 wherein said biasing clip is resilient and said first and second clip ends are in the first position when said material container is received in said distal receptacle.

15. The material dispenser of claim 11 wherein the biasing clip defines a semi-circular member having a semi-circular diameter about the same as the material container diameter.

16. The material dispenser of claim 11 wherein the biasing clip is located against and inwardly of the flange.

17. The material dispenser of claim 16 wherein the biasing clip is attached to the flange.

18. A dispenser that controls dispensing a viscous material from a material container that includes a movable surface that moves along an interior surface of the container so as to expel the viscous material through an opening in the container, the dispenser comprising:

(a) an elongate frame defining a frame axis;

(b) a rear receptacle pivotally attached to the frame and defining a planar rear wall that in a first position is generally transverse to the frame axis, said rear receptacle having a central opening therethrough and said receptacle pivotal between said first position and a second position in which said planar rear wall oriented at a non-orthogonal angle relative to said frame axis;

(c) a handle attached to the frame;

(d) an actuator;

(e) a plunger held in the frame and extending through said central opening in said planar rear wall so that operation of the actuator moves the plunger longitudinally relative to the frame and along the frame axis;

(f) a distal receptacle attached to the frame, said distal receptacle defining a planar distal wall and a rearward facing flange having first and second spaced apart flange ends defining an opening therebetween; and (g) a biasing clip on said distal receptacle for retaining a material container in an operative position between said rear and distal receptacles for dispensing said viscous material.

19. The dispenser of claim 18 wherein said material container has a material container diameter and said rear receptacle includes a forward facing flange defining a rear flange diameter that is larger than said material container diameter.

* * * * *